(12) United States Patent
Dietrich et al.

(10) Patent No.: US 11,524,544 B2
(45) Date of Patent: Dec. 13, 2022

(54) SPRING-ABSORBER SYSTEM WITH VARIABLE SPRING RATE

(71) Applicant: Bayerische Motoren Werke Aktiengesellschaft, Munich (DE)

(72) Inventors: Maximilian Dietrich, Seefeld (DE); Uwe Schatzberger, Buch (AT); Johannes Schroeder, Hausham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 212 days.

(21) Appl. No.: 16/856,445

(22) Filed: Apr. 23, 2020

(65) Prior Publication Data

US 2020/0247209 A1    Aug. 6, 2020

Related U.S. Application Data

(63) Continuation of application No. PCT/EP2018/074842, filed on Sep. 14, 2018.

(30) Foreign Application Priority Data

Oct. 24, 2017    (DE) ...................... 10 2017 218 905.3

(51) Int. Cl.
*B60G 17/04* (2006.01)
*B60G 15/12* (2006.01)
*B60G 17/052* (2006.01)

(52) U.S. Cl.
CPC ......... *B60G 17/0432* (2013.01); *B60G 15/12* (2013.01); *B60G 17/0523* (2013.01);
(Continued)

(58) Field of Classification Search
CPC ........ B60G 2500/22; B60G 2500/2064; B60G 17/0432; B60G 17/0523; B60G 15/12; B60G 2202/154; B60G 2202/24
See application file for complete search history.

(56) References Cited

U.S. PATENT DOCUMENTS 4,153,237 A  *  5/1979  Supalla .................. B60G 17/04
                                                         188/266.8
4,478,431 A  *  10/1984  Muller ................... B60G 11/30
                                                         267/64.25
(Continued)

FOREIGN PATENT DOCUMENTS

DE          26 04 809 A1     8/1977
DE          89 05 062 U1     9/1989
(Continued)

OTHER PUBLICATIONS

Peter, Shock Absorber for Bicycle has a Main Cylinder Linked to at Least Two Other Cylinders Via a Selector Switch to Vary the Suspension Reaction to Different Terrain, Mar. 25, 2004, EPO, DE 10251213 A1, Machine Translation of Description (Year: 2004).*

(Continued)

*Primary Examiner* — James A English
*Assistant Examiner* — Matthew D Lee
(74) *Attorney, Agent, or Firm* — Crowell & Moring LLP

(57) ABSTRACT

A spring-absorber system for a wheel suspension of a motor vehicle includes a suspension spring with a spring constant $k_T$ and an absorber filled with a fluid and mounted in parallel to the suspension spring. The spring-absorber system also includes at least two additional spring modules via which a total spring constant $k_G$ of the spring-absorber system can be varied.

1 Claim, 2 Drawing Sheets

(52) U.S. Cl.
CPC .... *B60G 2202/154* (2013.01); *B60G 2202/24* (2013.01); *B60G 2500/2064* (2013.01); *B60G 2500/22* (2013.01)

(56) References Cited

U.S. PATENT DOCUMENTS

| | | | | |
|---|---|---|---|---|
| 4,921,080 | A | * | 5/1990 | Lin .................... B60G 17/0152 188/266.5 |
| 4,975,849 | A | | 12/1990 | Ema |
| 5,347,457 | A | * | 9/1994 | Tanaka ............... B60G 17/0164 701/37 |
| 9,368,773 | B2 | | 8/2016 | Gendlin et al. |
| 2010/0140884 | A1 | * | 6/2010 | Runkel ................ B60G 15/12 280/5.514 |
| 2018/0347663 | A1 | * | 12/2018 | Gouselis ............... F16F 15/161 |

FOREIGN PATENT DOCUMENTS

| | | | | |
|---|---|---|---|---|
| DE | 42 26 754 | A1 | | 3/1993 |
| DE | 10251213 | A1 * | 3/2004 | ......... B60G 17/0432 |
| DE | 10 2004 032 083 | A1 | | 1/2006 |
| DE | 102004032083 | A1 * | 1/2006 | ............. B60G 11/56 |
| DE | 10 2008 004 609 | A1 | | 8/2009 |
| DE | 10 2011 002 631 | A1 | | 7/2012 |
| EP | 0394079 | A1 * | 10/1990 | ......... B60G 17/0152 |
| EP | 1 757 473 | A2 | | 2/2007 |
| EP | 2058155 | A1 * | 5/2009 | ............. B60G 17/08 |
| EP | 2258961 | A2 * | 12/2010 | ......... B60G 17/0432 |
| JP | 53-26021 | A | | 3/1978 |
| JP | 3-281418 | A | | 12/1991 |
| JP | 2004-276854 | A | | 10/2004 |
| JP | 2006-242277 | A | | 9/2006 |
| WO | WO 2011/034702 | A1 | | 3/2011 |

OTHER PUBLICATIONS

Peter, Shock Absorber for Bicycle has a Main Cylinder Linked to at Least Two Other Cylinders Via a Selector Switch to Vary the Suspension Reaction to Different Terrain, Mar. 25, 2004, EPO, DE 10251213 A1, Machine Translation of Description (Year: 2004) (Year: 2004).*

Schmidt, Spring and Damping Device for Wheel Suspension of Motor Vehicle, has Auxiliary Spring Connected With Hydraulic Cavity of Shock Absorber, and Spring Seat Adjustable by Hydraulic Device . . . , Jan. 26, 2006, EPO, DE 102004032083 A1, Machine Translation of (Year: 2006).*

PCT/EP2018/074842, International Search Report dated Dec. 14, 2018 (Three (3) pages).

German Search Report issued in German counterpart application No. 10 2017 218 905.3 dated May 29, 2018, with Statement of Relevancy (Nine (9) pages).

* cited by examiner

SPRING-ABSORBER SYSTEM WITH VARIABLE SPRING RATE

CROSS REFERENCE TO RELATED APPLICATIONS

This application is a continuation of PCT International Application No. PCT/EP2018/074842, filed Sep. 14, 2018, which claims priority under 35 U.S.C. § 119 from German Patent Application No. 10 2017 218 905.3, filed Oct. 24, 2017, the entire disclosures of which are herein expressly incorporated by reference.

BACKGROUND AND SUMMARY OF THE INVENTION

The invention relates to a spring-absorber system, in particular for a wheel suspension of a motor vehicle with a variable spring rate.

When designing spring-absorber systems, there is a conflict of objectives between the driving comfort achievable by the spring-absorber system and the achievable driving dynamics.

On the one hand, the spring-absorber system can be designed to be as comfortable as possible (high driving comfort), which can be realized for example by a low spring rate (also referred to as a spring constant). However, comfortable tuning of the spring-absorber system has limitations in the area of the sportiness and safety of the driving behavior of the motor vehicle (poor driving dynamics).

On the other hand, the spring-absorber system can be adjusted to the best possible dynamics or sportiness (good driving dynamics). For this purpose, a high spring rate is used, whereby limitations in driving comfort arise.

In order to enable variable tuning of the spring-absorber system and thus to be able variation between sporty and comfortable tuning of the spring-absorber system, various active spring-absorber systems are known in the prior art.

The spring rate of the spring-absorber systems is controlled in systems that are known in the prior art by an air spring with a variable spring rate. The disadvantage, however, is that the pressures of the air have to be generated in a unit with a high control complexity and both a large installation space and a high energy requirement.

Other known systems, for example, use spring packets of steel springs acting in series, which must be designed to be stable in order to withstand the masses to be cushioned. Due to the stable design, the spring packets have heavy weights and a large installation space requirement, which is particularly detrimental in the light of energy consumption in the case of motor vehicles. In addition, the spread between driving comfort adjustment and dynamics adjustment is small and the variability thereof is small.

In the prior art, systems are also known in which the springs of the spring-absorber system transfers forces generated by the vehicle masses directly to the fluid in the absorber. This results in very high pressures in the absorber and all other components carrying a flow of fluid, so that the absorber and the other components must be designed to be appropriately stable. As a result, both the weight of the system and the installation space increase. In addition, seals must be designed for the high pressures, so that they become more expensive and have a shorter life than seals that must be designed for lower pressures. Furthermore, the spring rate in such a system is usually dependent on the stroke of the absorber, so that a constant spring rate cannot be guaranteed over the entire spring travel. With constant loading, the spring rate can usually not be adjusted or only with an additional actuator, so that the functionality is limited or can only be produced with additional costs with an increased space requirement and increased weight.

The invention is therefore based on the object of providing a spring-absorber system that has a controllable total spring constant, has a small installation space requirement and can switch between different total spring constants quickly and without expending a large amount of energy.

According to the invention, a spring-absorber system for a wheel suspension of a motor vehicle or a single-track motor vehicle is proposed. The spring-absorber system includes a suspension spring with a spring constant $k_T$ and a fluid-filled absorber connected in parallel with and acting in parallel with the suspension spring. The spring-absorber system also includes at least two additional spring modules. Each additional spring module comprises an additional container, wherein each additional container includes an additional container volume. The additional container is acted on by an additional spring with a spring constant $k_n$. The additional spring may be placed in or on the additional container. The additional container volumes of the additional spring modules are each connected to an absorber section of the absorber via a tubular fluid line. The absorber section of the absorber has an absorber section volume, which is reduced during the compression stage of the absorber. Furthermore, at least one additional spring module of at least two additional spring modules includes a controllable shut-off valve, with which the respective fluid line of the respective additional spring module can be blocked. The spring-absorber system may, for example, be integrated into a telescopic fork of a single-track vehicle or may include such a telescopic fork.

The fluid flowing through the absorber and the additional spring elements is in particular an oil. The suspension spring and the absorber support a mass of the motor vehicle against one of the vehicle axles. The absorber is preferably arranged within the suspension spring in the form of a coil spring, so that the suspension spring and the absorber form a compact component.

The absorber comprises two internal volumes separated by a piston. The piston is displaced by a piston rod when the spring is compressed or expanded, so that the two internal volumes of the absorber change. When the spring-absorber system expands, the absorber is subjected to tension (tension stage) and when the system is compressed the absorber is subjected to pressure (compression stage). The internal volumes of the absorber therefore change the respective volumes thereof in the compression stage and the tension stage. The fluid in the respective internal volume flows partly and depending on the movement from one internal volume of the absorber through valves into the other part of the internal volume. However, the total internal volume of the absorber does not remain constant across the compression and tension stages, since due to the volume of the piston rod in the absorber, with the piston rod retracted the absorber has a lower total volume than the absorber with the piston rod extended. The difference of the total volume (difference volume) is compressed in the additional spring modules during the compression stage according to the invention. Therefore, the additional spring modules have a direct flow connection to the absorber section of the absorber, wherein the internal volume or the absorber section volume of the absorber is reduced in the compression stage of the absorber, so that the fluid can flow into the additional spring modules in the compression stage of the absorber and from the additional spring modules into the absorber in the tension stage of the absorber. The suspension spring carries out the main suspension work and preferably has a spring constant between 100 and 200 N/mm. The additional springs of the additional spring modules represent by their spring travel the spread to be formed by the spring-absorber system, i.e., the difference between the possible total spring constants (or total spring rates). Due to the division of tasks between the suspension spring, which carries out the main suspension work, and the additional springs, which carry out the additional suspension work that causes the spread, the entire spring-absorber system can be arranged in various ways in the vehicle and particularly in space-saving ways, so that the proposed spring-absorber system has a particularly favorable installation space requirement.

The result of the interconnection of the suspension spring with the additional springs of the additional spring module is that the additional springs of the additional spring module act in series with each other and the series-connected additional springs act together in parallel with the suspension spring.

Therefore, the total spring constant $k_G$ of the spring-absorber system is the sum of the spring constant $k_T$ of the suspension spring and the total additional spring constant $k_{Gn}$ of the additional springs, which act on the additional container with a flow connection to the absorber section.

Only those additional containers in which the fluid flow is not blocked by a shut-off valve have a flow connection to the absorber section.

The formula for the total spring constant $k_G$ is therefore:

$$k_G = k_T + k_{Gn}$$

The total additional spring constant $k_{Gn}$ results from the inverse of the sum of all the inverse values of the spring constants $k_n$ due to the series connection.

However, this only applies if the hydraulic transmission ratio of the absorber is identical to each of the additional spring modules, so that a force acting externally on the absorber and forcing the hydraulic fluid from the absorber into the additional spring modules is uniformly distributed to the additional spring modules or to the additional springs, so that an identical force acts on each of the additional springs.

In the case of an identical hydraulic transmission ratio between the absorber and each of the additional spring modules or in the case of a transmission ratio of 1:1 between the additional spring modules, the following formula for the total additional spring constant $k_{Gn}$ therefore applies $$k_{Gn} = \left(\sum \frac{1}{k_n}\right)^{-1}.$$

wherein only those spring constants $k_n$ are incorporated, whose additional springs apply pressure to an additional container that is not isolated in terms of flow from the absorber by the respective shut-off valve.

The following formula for the total spring rate $k_G$ therefore applies in this case:

$$k_G = k_T + \left(\sum \frac{1}{k_n}\right)^{-1}$$

If the hydraulic transmission ratio between the additional spring modules is not 1:1, for example due to different active surfaces over which the hydraulic fluid acts on the respective additional spring, or different forces acting on the additional springs through the hydraulic fluid, the total additional spring constant $k_{Gn}$ cannot be calculated according to the above formula, since the individual active additional spring constants $k_n$ are incorporated into the resulting total additional spring constant depending on the force acting on the respective spring.

An embodiment is also advantageous in which at least one additional spring module of at least two additional spring modules comprises a throttle valve acting in parallel with the shut-off valve. The throttle valve throttles the flow through the respective fluid line when the associated shut-off valve blocks the unthrottled flow between the respective additional container of the additional spring module and the absorber. If the shut-off valve is controlled to control the total spring rate of the spring-absorber system and is brought from its flow position into its blocking position, the currently prevailing pressure is maintained in the additional container that is isolated by the shut-off valve (blocking position). If the shut-off valve is later returned to a position (flow position) enabling flow through the shut-off valve and the pressure in the absorber has changed in the meantime, it can result in a sudden pressure equalization between the different sections of the spring-absorber system, so that the absorber, due to the pressure surge occurring during the pressure equalization, abruptly pushes the piston rod in or out. Due to the throttle valve, the pressure between the sections can slowly adjust to each other, so that there can be no differential pressure between the sections and thus no sudden pressure equalization. The throttling of the throttle valve can be adjusted and can be controlled in order to be able to control the flow of the fluid through the throttle valve in a targeted manner.

In order to be able to control the pressure equalization in a targeted manner, an advantageous development provides that at least one of the additional spring modules comprises a check valve blocking the fluid flow from the absorber to the respective additional container through the throttle valve, wherein the check valve is connected in series with the throttle valve and in parallel with the shutoff valve. Instead of the check valve, the respective additional spring module can also include a second controllable shut-off valve.

In a further advantageous embodiment, the respective additional spring of an additional spring module of at least two additional spring modules is a gas compression spring or a coil spring. Alternatively, the springs can also be formed by a rubber spring, an air spring or another spring applying pressure to the additional container volume. The various additional springs of the additional spring modules of the spring-absorber system can be formed by a different spring type. Preferably, an additional spring is formed by a nitrogen-based gas pressure spring, which has a spring constant of 1 to 2 N/mm.

In order to be able to generate different spring constants by the controlled shut-off of the shut-off valves, a particularly advantageous development provides that the spring constants $k_n$ are different from each other.

It is further advantageous if a single spring constant $k_n$ of all the spring constants $k_n$ lies between 1 and 2 N/mm. It is further advantageous if the other spring constants $k_n$ are between 10 and 50 N/mm.

Due to the additional spring module with the additional spring, which has a very small spring constant $k_n$ of in particular between 1 and 2 N/mm, the case in which the additional spring module with the very small spring constant $k_n$ contributes to the total additional spring constant $k_{Gn}$ results in a much lower value for the total additional spring constant $k_{G_n}$ that is less than or equal to the very small spring constant $k_n$. Thus, the total spring constant $k_G$ of the spring-absorber system corresponds essentially to the spring constant $k_T$ of the suspension spring. In this case, the additional containers serve only as compensating containers for the volume displaced by the piston rod.

The spring constants $k_n$ of the additional springs are a multiple of each other in an advantageous development of the additional spring modules. Alternatively, the individual spring constants $k_n$ can be given by fixed intermediate values, so that the spring constant $k_n$ are values increasing in increments of ten, for example. Regardless of whether the spring constants result from fixed intermediate values or are a multiple of each other, an additional spring may have a very low spring constant $k_n$ that is independent of the other spring constants $k_n$, so that the additional containers of the spring modules can act as compensating containers for the fluid.

In an advantageous embodiment, the additional container is a cylinder with two cylinder chambers with variable respective volumes separated by a movable separating piston. A first cylinder chamber of the two cylinder chambers of the cylinder is connected as the additional container volume via the respective fluid line to the absorber section, the absorber section volume of which is reduced during the compression stage of the absorber. A second cylinder chamber of the two chambers of the cylinder accommodates the respective additional spring of the respective additional spring module. The additional spring accommodated in the second cylinder chamber applies pressure to the first cylinder chamber by means of the separating piston and is supported on the cylinder for this purpose.

In order to form multiple additional spring modules integrally in a material-saving and space-saving manner, an advantageous development provides that at least two additional spring modules comprise a common cylinder. The common cylinder comprises at least three cylinder chambers, each separated by a separating piston. The first cylinder chamber accommodates the additional spring of a first additional spring module and a third cylinder chamber accommodates the additional spring of a second additional spring module. The additional springs are each supported on the common cylinder and can act together on the second cylinder chamber so as to apply pressure. Alternatively, the two additional springs can each act on a cylinder chamber so as to apply pressure, wherein the additional spring in the first cylinder chamber acts on the second cylinder chamber so as to apply pressure and the additional spring in the third cylinder chamber acts on a fourth cylinder chamber so as to apply pressure. If the second and the fourth cylinder chambers are directly adjacent to each other, they are embodied separated from each other by a wall that is arranged between them.

In order to improve the response behavior of the additional spring modules or the separating pistons, an advantageous embodiment variant provides that the separating piston comprises a membrane between one of the cylinder chambers and a cavity formed by the separating piston. The membrane is pressed into the cavity by a pressure acting in the cylinder chamber or is sucked into the cylinder chamber. At a low pressure, which is not sufficient to move the entire separating piston, the membrane acts as a spring element, so that even at low pressure, spring work is carried out. At a sufficiently high pressure, the entire separating piston is moved. As a result, the response of the additional spring module is improved, so that it performs spring work faster or even at lower pressures when the pressure changes in the cylinder chamber. Thus, the so-called slip-stick effect of the separating piston is also reduced, because the separating piston is only moved in the event of sufficiently high pressures and the spring work is carried out by the membrane at a lower pressure.

In order to be able to realize a particularly compact and space-saving spring-absorber system, a further development provides that at least one additional spring module of the additional spring modules is formed integrally with the absorber and to form one component. The absorber with the integrally formed additional spring module is preferably arranged inside the suspension spring to form a compact spring-absorber system overall.

According to the invention, a further method for controlling the spring constants of the spring-absorber system is proposed. For this purpose, a spring-absorber system according to the invention as described above is used. For setting or controlling the spring constant, the shut-off valve (s) of at least two additional spring modules are each controlled, depending on a total spring constant to be achieved $k_G$, by means of a shut-off valve controller to block (shut-off position) or to enable (flow position) the fluid flow between the respective additional containers and the absorber section, the absorber section volume of which is reduced during the compression stage of the absorber.

Due to the control and the design described above, the following formula results for the total spring constant $k_G$, at least with the same hydraulic transmission ratio between the absorber and each of the additional spring modules $$k_G = k_T + \left(\sum \frac{1}{k_n}\right)^{-1}$$

In a sum of the inverse values of the spring constants $k_n$, only the spring constants $k_n$ of the additional spring modules are incorporated with shut-off valves that are in a position (flow position) enabling a fluid flow between the respective additional container volume and the absorber section volume.

The features disclosed above can be combined in any way, as far as this is technically possible and these are not in conflict with each other. Other advantageous developments of the invention are characterized in the subordinate claims or are illustrated below in more detail on the basis of the Figures together with the description of the preferred embodiment of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
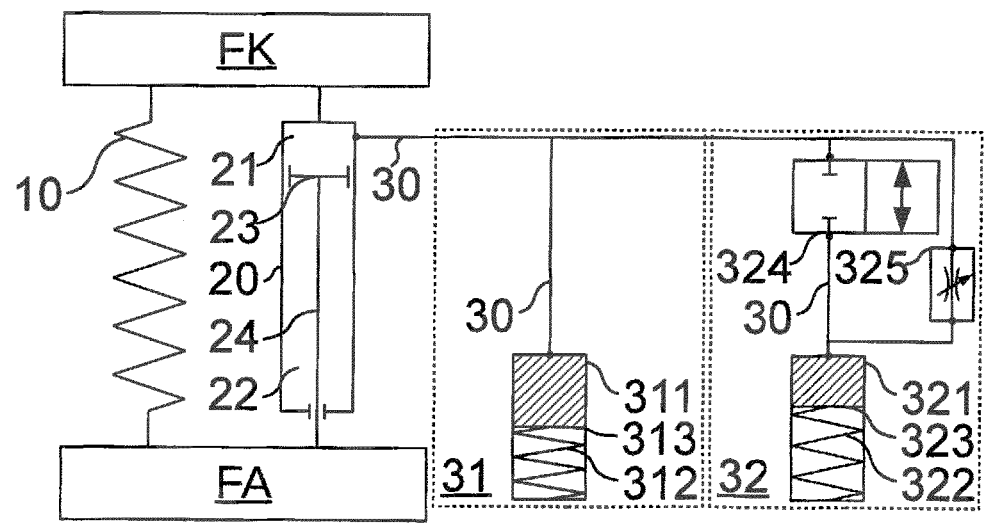
FIG. 1 shows a spring-absorber system with two additional spring modules.

The Figures are exemplary and schematic. The same reference characters in the Figures indicate the same functional and/or structural characteristics.

Figure 2:
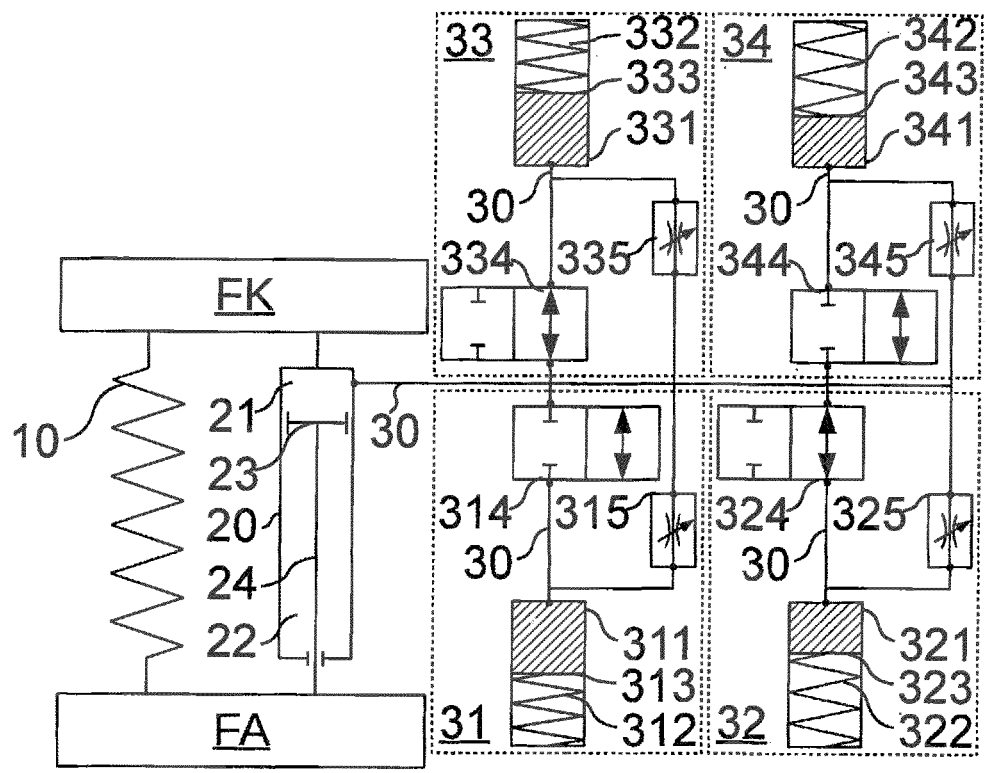
FIG. 2 shows a spring-absorber system with four additional spring modules.
Figure 3:
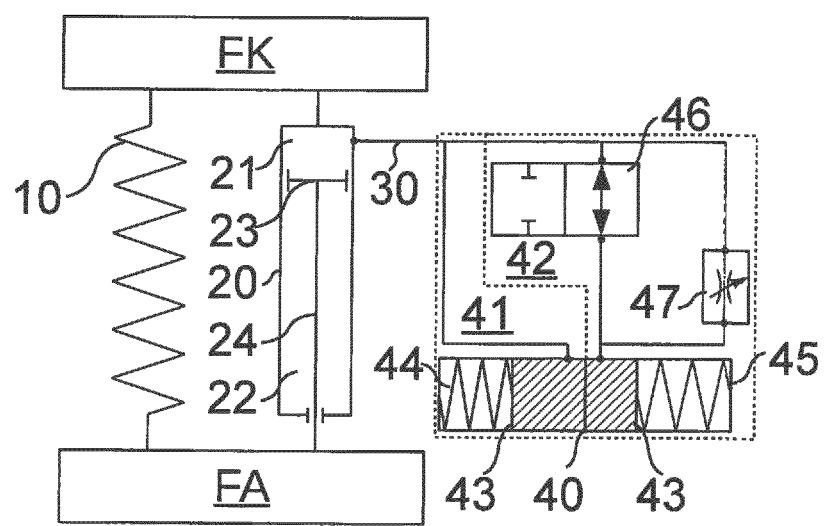
FIG. 3 shows a spring-absorber system with two additional spring modules formed integrally with each other.

FIGS. 1 to 3 each show a spring-absorber system according to the invention system, which differ only by the respective additional spring modules thereof. The vehicle body FK and the vehicle axle FA are supported against each other by the suspension spring 10, wherein the absorber 20 dampens the movements and the resulting forces. The absorber 20 is a cylinder supported on the vehicle body FK, into which the piston rod 24 extends from the vehicle axle FA. The piston rod 24 is fixed to a piston 23 in the cylinder and is thereby embodied to move the piston 23 in the cylinder by a movement of the piston rod 24. The cylinder of the absorber 20 is divided by the piston 23 into a first and a second absorber section 21, 22, each of which determine an absorber section volume. The absorber sections 21, 22 and the respective associated absorber section volumes reduce or increase depending on the movement of the piston rod 24 and the piston 23. If the piston rod 24 moves into the cylinder (compression stage), the first absorber section 21 and the associated absorber section volume become smaller and the second absorber section 22 and the associated absorber section volume become larger, if the piston rod 24 moves out of the cylinder (tension stage), the first absorber section 21 and the associated damping section volume will become larger, and the second absorber section 22 and the associated absorber section volume will become smaller.

In FIG. 1 two additional spring modules 31, 32 are connected via a fluid line 30 to the first absorber section 21 or to the absorber section volume. The additional spring module 31 comprises an additional container as a cylinder 311 that is filled with the fluid. The fluid in the cylinder 311 is pressurized via the separating piston 313 by means of an additional spring 312, so that the spring force of the additional spring 312 exerts a pressure on the fluid, which is transferred via the fluid line 30 into the absorber 20 and through the absorber 20 to the vehicle body FK and the vehicle axle FA. As a result of the shut-off valve 324 of the second additional spring module 32 being in a position (shut-off position) that blocks the fluid line to the additional container that is embodied as a cylinder 321, the additional spring 322 does not act on a fluid with a flow connection to the absorber 20. Therefore, second additional spring 322 does not act on the vehicle body FK and the vehicle axle FA. In the switching state of the shut-off valve 324 shown in FIG. 1, the additional spring 312 and the suspension spring 10 act in parallel with each other, so that the total spring constant $k_{G1}$ of the spring-absorber system of FIG. 1 results from the sum of the spring constant $k_T$ of the spring and the spring constant $k_{31}$ of the first additional spring module ($k_n$, wherein n is replaced by the designation of the acting additional spring module 31). In FIG. 1, the total spring constant thus results from the formula $k_{G1}=k_T+k_{31}$. The spring constant $k_{32}$ of the additional spring 322 is a multiple smaller than the spring constant $k_{31}$, so that by switching the shut-off valve 324 from the shut-off position shown into a flow position that makes the connection to the absorber the total spring rate $k_G$ would essentially correspond to $k_T$.

In the spring-absorber system shown in FIG. 2, the four additional spring modules 31, 32, 33, 34 are each embodied with a shut-off valve 314, 324, 334, 344, to which a throttle valve 315, 325, 335, 345 is connected in parallel for flow purposes, so that a slow pressure equalization can occur at a high differential pressure between the additional spring modules 31, 32, 33, 34 or the absorber 20. The additional spring modules each have a cylinder 311,321, 331, 341 in which a fluid is pressurized by means of an additional spring 312, 322, 332, 342 using a respective separating piston 313, 323, 333, 343. The shut-off valves 324, 334 of the second and third additional spring modules are in their respective flow positions, so that the additional springs 322, 332 of the second and third additional spring modules 32, 33 transfer the spring force thereof by means of the fluid to the absorber 20 and thus to the vehicle body FK and the vehicle axle FA. The additional springs 322, 332 act in series with each other and in parallel with the suspension spring 10, so that the following formula results for the total spring constant $k_{G2}$ of the spring-absorber system in the switching position of the shut-off valves 314, 324, 334, 344 shown in FIG. 2

$$k_{G2} = k_T + \left(\frac{1}{k_{32}} + \frac{1}{k_{33}}\right)^{-1}.$$

FIG. 3 shows an alternative embodiment to the spring-absorber system in FIG. 1, with which the first and second additional spring modules 41, 42 comprise a common cylinder 40, in which the respective additional containers that are pressurized by the additional springs 44, 45 are arranged. Of the additional spring modules 41, 42, only the second additional spring module 42 comprises a shut-off valve 46 with which the throttle valve 47 is connected in parallel. Due to the switching position of the shut-off valve 46, which is set in its flow position, the additional springs 44, 45 of the additional spring modules 41, 42 act in series with each other. Since as described in FIG. 1 one of the spring constants of the additional springs 41, 42 is very small, the additional containers of the additional spring modules 41, 42 act essentially as a compensating container for the fluid displaced by the piston rod 24 without exerting a great influence on the total spring constant $k_G$ of the spring-absorber system. The total spring constant $k_G$ of the spring-absorber system in FIG. 3 therefore corresponds essentially to the spring constant $k_T$ of the suspension spring.

The implementation of the invention is not limited to the preferred embodiments indicated above. Rather, a number of variants is conceivable that make use of the presented solution even in fundamentally different designs. For example, the respective pretensioning of the additional springs could be mechanically adjustable by a respective pretensioning mechanism.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring-absorber system for a wheel suspension of a motor vehicle comprising:
   a spring module including a suspension spring with a spring constant $k_T$ and an absorber connected in parallel with the suspension spring and filled with a fluid; and
   at least two additional spring modules, each containing a respective container, wherein each container includes a respective container volume which is subjected to pressure by a respective additional suspension spring with a respective spring constant $k_n$, wherein the container volumes each have a flow connection via a respective fluid line to an absorber section of the absorber, wherein an absorber section volume of the absorber section is reduced during a compression stage of the absorber;

wherein at least one additional spring module of the at least two additional spring modules includes a controllable shut-off valve with which the respective fluid line is blockable;

wherein at least two additional spring modules of the at least two additional spring modules have a common cylinder comprising at least three cylinder chambers each separated by a separating piston, wherein a first cylinder chamber of the at least three cylinder chambers accommodates the respective additional suspension spring of one of the at least two additional spring modules and a third cylinder chamber of the at least three cylinder chambers accommodates the respective additional suspension spring of a second one of the at least two additional spring modules.

* * * * *